United States Patent
Maehling et al.

(10) Patent No.: US 9,908,955 B2
(45) Date of Patent: Mar. 6, 2018

(54) COPOLYMER WITH HIGH CHEMICAL HOMOGENEITY AND USE THEREOF FOR IMPROVING THE COLD FLOW PROPERTIES OF FUEL OILS

(71) Applicant: BASF SE, Ludwigshafen (DE)

(72) Inventors: Frank-Olaf Maehling, Mannheim (DE); Jan Strittmatter, Mannheim (DE); Irene Troetsch-Schaller, Bissersheim (DE); Ivette Garcia-Castro, Ludwigshafen (DE); Michael Schroers, Bad Duerkheim (DE); Uwe Rebholz, Mehlingen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/077,196

(22) Filed: Mar. 22, 2016

(65) Prior Publication Data
US 2016/0200844 A1    Jul. 14, 2016

Related U.S. Application Data

(60) Continuation of application No. 14/165,286, filed on Jan. 27, 2014, now abandoned, which is a division of application No. 13/176,317, filed on Jul. 5, 2011, now Pat. No. 8,721,744.

(60) Provisional application No. 61/361,551, filed on Jul. 6, 2010.

(51) Int. Cl.
| C08F 8/14 | (2006.01) |
|---|---|
| C08F 210/02 | (2006.01) |
| C08F 220/18 | (2006.01) |
| C08F 220/06 | (2006.01) |
| C10L 1/196 | (2006.01) |
| C10L 1/197 | (2006.01) |
| C10L 10/14 | (2006.01) |
| C10L 10/16 | (2006.01) |

(52) U.S. Cl.
CPC .............. *C08F 210/02* (2013.01); *C08F 8/14* (2013.01); *C08F 220/06* (2013.01); *C08F 220/18* (2013.01); *C10L 1/1963* (2013.01); *C10L 1/1973* (2013.01); *C10L 10/14* (2013.01); *C10L 10/16* (2013.01)

(58) Field of Classification Search
CPC ........ C08F 220/06; C08F 220/18; C08F 8/14; C08F 210/02; C10L 10/14; C10L 10/16; C10L 1/1963; C10L 1/1973
See application file for complete search history.

(56) References Cited

U.S. PATENT DOCUMENTS

| 3,447,915 A * | 6/1969 | Otto ...................... C08L 33/062 44/393 |
|---|---|---|
| 3,621,004 A | 11/1971 | Eckert |
| 4,404,000 A | 9/1983 | Toyoshina et al. |
| 4,762,892 A | 8/1988 | Koch et al. |
| 4,932,980 A | 6/1990 | Mueller et al. |
| 6,762,254 B1 | 7/2004 | Deckers et al. |
| 8,273,555 B2 | 9/2012 | Haering |
| 8,293,690 B2 | 10/2012 | Feustel et al. |
| 2007/0094920 A1* | 5/2007 | Ahlers ................... C10L 1/1973 44/393 |
| 2007/0270318 A1* | 11/2007 | Siggelkow .............. C10L 1/146 508/467 |
| 2008/0178523 A1 | 7/2008 | Ahlers et al. |
| 2010/0251604 A1 | 10/2010 | Maehling et al. |

FOREIGN PATENT DOCUMENTS

| DE | 1 923 454 | 11/1970 |
|---|---|---|
| DE | 10 2006 022 720 A1 | 11/2007 |
| RU | 2 388 795 C2 | 5/2010 |
| WO | WO 2008/059055 A1 | 5/2008 |
| WO | WO 2008/113757 A1 | 9/2008 |
| WO | WO 2011/018383 A1 | 2/2011 |
| WO | WO 2011/134923 A1 | 11/2011 |
| WO | WO 2011/138400 A1 | 11/2011 |

OTHER PUBLICATIONS

Notice of Allowance dated Jun. 8, 2015 in Russian Patent Application No. 2013104629/04(006913).

Ella Bezdushna, et al., "Microwave-Assisted Esterification of Methacrylic Acid and Polymer-Analogous Esterification of Poly-[ethylene-co-(acrylic acid)] with Dissimilar Phenols", Macromolecular Rapid Communication, Macromolecular Journal, 2007, 28(4), pp. 443-448.

"Ullmann's Encyclopedia of Industrial Chemistry", Fifth, Completely Revised Edition, vol. A12, 1989, pp. 617-627.

(Continued)

*Primary Examiner* — Satya Sastri
(74) *Attorney, Agent, or Firm* — Oblon, McClelland, Maier & Neustadt, L.L.P.

(57) ABSTRACT

A copolymer with high chemical homogeneity, consisting of (A) 50 to 30% by weight of ethylene, (B) 50 to 70% by weight of $C_4$- to $C_{24}$-hydrocarbyl ester of (meth)acrylic acid, (C) 0 to 5% by weight of (meth)acrylic acid and (D) 0 to 10% by weight of copolymerizable monomers, obtainable by polymerizing a mixture of 80 to 60% by weight of ethylene, 20 to 40% by weight of (meth)acrylic acid and 0 to 10% by weight of copolymerizable monomers in a backmixing, continuous polymerization apparatus, and subsequently polymer-analogously esterifying the resulting copolymer with $C_4$- to $C_{24}$-hydrocarbinols. The inventive copolymer is suitable for improving the cold flow properties of fuel oils, for lowering the lower mixing temperature of cold flow improver additives into fuel oils, and for improving the filterability of fuel oils comprising cold flow improver additives.

3 Claims, No Drawings

(56) References Cited

OTHER PUBLICATIONS

International Search Report dated May 8, 2012, in PCT/EP2011/061275 filed Jul. 5, 2011 (with English Translation of Category of Cited Documents).

* cited by examiner

COPOLYMER WITH HIGH CHEMICAL HOMOGENEITY AND USE THEREOF FOR IMPROVING THE COLD FLOW PROPERTIES OF FUEL OILS

This application is a continuation application of U.S. Ser. No. 14/165,286 filed on Jan. 27, 2014 which claims the benefit to priority to divisional application U.S. Ser. No. 13/176,317 filed on Jul. 5, 2011 which claims the benefit to priority to U.S. 61/361,551 filed on Jul. 6, 2010.

The present invention relates to a copolymer with high chemical homogeneity, consisting of
(A) 50 to 30% by weight of ethylene,
(B) 50 to 70% by weight of a $C_4$- to $C_{24}$-hydrocarbyl ester of acrylic acid or methacrylic acid, or of a mixture of such hydrocarbyl esters,
(C) 0 to 5% by weight of acrylic acid and/or methacrylic acid and
(D) 0 to 10% by weight of one or more copolymerizable monomers,
where all monomer components in the copolymer together add up to 100% by weight,
obtainable by polymerizing a mixture of 80 to 60% by weight of ethylene, 20 to 40% by weight of acrylic acid and/or methacrylic acid and 0 to 10% by weight of one or more copolymerizable monomers, where all monomer components in the mixture together add up to 100% by weight, in a backmixing, continuous polymerization apparatus, and subsequently polymer-analogously esterifying the resulting copolymer of ethylene and (meth)acrylic acid or of essentially ethylene and (meth)acrylic acid with a $C_4$- to $C_{24}$-hydrocarbinol or a mixture of $C_4$- to $C_{24}$-hydrocarbinols.

The present invention further relates to a process for preparing this copolymer with high chemical homogeneity.

The present invention further relates to the use of this terpolymer for improving the cold flow properties of fuel oils, for lowering the lower mixing temperature of cold flow improver additives into fuel oils and for improving the filterability of fuel oils comprising cold flow improver additives.

Middle distillate fuels of fossil origin, especially gas oils, diesel oils or light heating oils, which are obtained from mineral oil, have different contents of paraffins depending on the origin of the crude oil. At low temperatures, there is precipitation of solid paraffins at the cloud point ("CP"). In the course of further cooling, the platelet-shaped n-paraffin crystals form a kind of "house of cards structure" and the middle distillate fuel ceases to flow even though its predominant portion is still liquid. The precipitated n-paraffins in the temperature range between cloud point and pour point ("PP") considerably impair the flowability of the middle distillate fuels; the paraffins block filters and cause irregular or completely interrupted fuel supply to the combustion units. Similar disruptions occur in the case of light heating oils.

It has long been known that suitable additives can modify the crystal growth of the n-paraffins in middle distillate fuels. Very effective additives prevent middle distillate fuels from solidifying even at temperatures a few degrees celsius below the temperature at which the first paraffin crystals crystallize out. Instead, fine, readily crystallizing, separate paraffin crystals are formed, which, even when the temperature is lowered further, pass through filters in motor vehicles and heating systems, or at least form a filtercake which is permeable to the liquid portion of the middle distillates, so that disruption-free operation is ensured. The efficacy of the flow improvers is typically expressed, in accordance with European standard EN 116, indirectly by measuring the cold filter plugging point ("CFPP"). Ethylene-vinyl carboxylate copolymers such as ethylene-vinyl acetate copolymers ("EVA"), for example, have already been used for some time as cold flow improvers or middle distillate flow improvers ("MDFIs") of this kind.

The problems with the cold flow performance are similar for biofuel oils ("biodiesel") and mixtures of middle distillate fuels and biofuel oils. It is possible here in principle to improve the cold flow performance using the same additives as in the case of pure middle distillate fuels.

One disadvantage of these additives when used in middle distillate fuels is that the paraffin crystals modified in this way, owing to their higher density compared to the liquid portion, tend to settle out more and more at the bottom of the vessel in the course of storage of the middle distillate fuel. As a result, a homogeneous low-paraffin phase forms in the upper part of the vessel, and a biphasic paraffin-rich layer at the bottom. Since the fuel is usually drawn off just above the vessel bottom both in vehicle fuel tanks and storage or supply tanks of mineral oil dealers, there is the risk that the high concentration of solid paraffins leads to blockages of filters and metering devices. The further the storage temperature is below the precipitation temperature of the paraffins, the greater this risk becomes, since the amount of paraffin precipitated increases with falling temperature. In particular, fractions of biodiesel also enhance this undesired tendency of the middle distillate fuel to paraffin sedimentation. By virtue of the additional use of paraffin dispersants or wax antisettling additives ("WASAs"), the problems outlined can be reduced.

WO 2008/059055 discloses terpolymers formed from ethylene, vinyl acetate and relatively long-chain (meth) acrylic esters, for example 2-propylheptyl acrylate, as cold flow improvers for fuel oils.

In addition to the abovementioned ethylene-vinyl carboxylate copolymers, the prior art also recommends ethylene-(meth)acrylic ester copolymers as cold flow improvers for middle distillate fuels and biofuel oils. For example, DE 10 2006 022 720 A1 describes copolymers formed from 18 to 35 mol % of one or more vinyl esters and/or (meth)acrylic esters and 65 to 82% by weight of ethylene as an additive for improving the cold flow properties of fuel oils of animal or vegetable origin. Acrylic or methacrylic ester components emphasized are the $C_1$- to $C_{20}$-alkyl esters of acrylic acid and methacrylic acid, such as methyl (meth)acrylate, ethyl (meth)acrylate, propyl (meth)acrylate, n- and isobutyl (meth)acrylate, hexyl, octyl, 2-ethylhexyl, decyl, dodecyl, tetradecyl, hexadecyl and octadecyl (meth)acrylate.

It was an object of the present invention to provide products with high chemical homogeneity, which bring about very good cold performance in fuel oils as a result of the high chemical homogeneity thereof. More particularly, the PP value for these fuel oils should be lowered effectively. At the same time, these products, owing to their high chemical homogeneity, should also lower the lower mixing temperature of cold flow improver additives into fuel oils and improve the filterability of fuel oils comprising cold flow improver additives.

The object is achieved in accordance with the invention by the copolymer having high chemical homogeneity cited at the outset, formed from components (A), (B), (C) and (D).

To characterize the "high chemical homogeneity" of the inventive copolymer, the constancy of the values from the acid number determinations for different copolymer fractions with different polymer chain lengths, which are obtained by fractional precipitation in the course of cooling of a solution of the inventive copolymer, should be employed here. The definition of an inventive copolymer with "high chemical homogeneity" shall typically include, in the context of the present invention, all those copolymers which, in the course of cooling of a 20% by weight solution of the copolymer formed from components (A), (B), (C) and (D) in the composition specified, prepared by heating to 60° C., in a mixture composed of the solvents decane and ethylbenzene in a weight ratio of 1:1, to +10° C., 0° C. and −10° C. in each case, give rise to precipitates which— together with the residue, freed of the solvents, from the mother liquor of the last precipitation—after filtration and removal of the solvents, result in a total of 4 fractions, the particular individual acid numbers of which are all within the value range of ±15%, especially ±10%, in particular ±5%, of the arithmetic mean of all 4 acid numbers determined. The acid numbers are determined here titrimetrically as usual in mg KOH/g of copolymer.

Suitable and preferred $C_4$- to $C_{24}$-hydrocarbinols are especially $C_4$- to $C_{24}$-alkanols, especially $C_8$- to $C_{18}$-alkanols, in particular $C_{10}$- to $C_{15}$-alkanols, and also $C_7$ to $C_{24}$-arylalkanols and $C_5$- to $C_8$-cycloalkanols.

The inventive copolymer is preferably formed from
(A) 45 to 35% by weight, especially 42 to 38% by weight, of ethylene,
(B) 55 to 65% by weight, especially 58 to 62% by weight, of a $C_4$- to $C_{24}$-hydrocarbyl ester of acrylic acid or methacrylic acid, or of a mixture of such hydrocarbyl esters,
(C) 0 to 3.5% by weight, especially 0 to 2% by weight; of acrylic acid and/or methacrylic acid and
(D) 0 to 5% by weight, especially 0 to 2.5% by weight, of one or more copolymerizable monomers.

Suitable $C_4$- to $C_{24}$-hydrocarbyl esters of acrylic acid or methacrylic acid for component (B) are preferably the alkyl esters of acrylic acid or methacrylic acid, especially the esters of acrylic acid and methacrylic acid with $C_8$- to $C_{18}$-alkanols, especially $C_{10}$- to $C_{15}$-alkanols, for example with n-butanol, sec-butanol, isobutanol, tert-butanol, n-pentanol, tert-pentanol, n-hexanol, n-heptanol, n-octanol, 2-ethylhexanol, n-nonanol, isononanol, n-decanol, 2-propylheptanol, n-undecanol, n-dodecanol, n-tridecanol, isotridecanol, n-tetradecanol, n-pentadecanol, n-hexadecanol, n-heptadecanol, n-octadecanol and n-eicosanol, and also the esters of acrylic acid and methacrylic acid with $C_7$- to $C_{24}$-arylalkanols and with $C_5$- to $C_8$-cycloalkanols, for example with 1- or 2-phenoxyethanol, cyclopentanol and cyclohexanol. A minimum chain length of 4, especially of 8, in particular of 10, carbon atoms in the case of alkanols is necessary for the solubility performance of the inventive copolymer in the fuel oils.

The inventive copolymer may also comprise, in copolymerized form, two or more species of the $C_4$- to $C_{24}$-hydrocarbyl esters of acrylic acid or methacrylic acid mentioned as component (B).

In a preferred embodiment, the inventive copolymer comprises, as component (B), a $C_8$- to $C_{18}$-alkyl ester of acrylic acid or methacrylic acid or of a mixture of such alkyl esters.

The inventive copolymer is obtainable by polymerizing a mixture of 80 to 60% by weight of ethylene, 20 to 40% by weight of acrylic acid and/or methacrylic acid and 0 to 10% by weight of one or more copolymerizable monomers, where all monomer components in the mixture together add up to 100% by weight, in a backmixing, continuous polymerization apparatus, and subsequently polymer-analogously esterifying the resulting copolymer of ethylene and (meth) acrylic acid or of essentially ethylene and (meth)acrylic acid with a $C_4$- to $C_{24}$-hydrocarbinol or a mixture of $C_4$- to $C_{24}$-hydrocarbinols. The polymerization step is normally performed by the customary high-pressure polymerization techniques at a pressure of 50 to 5000 bar, especially 1000 to 2500 bar, in particular 500 to 2000 bar, typically 1600 to 1800 bar. In general, the temperatures employed are 50 to 450° C., especially 100 to 350° C., in particular 150 to 250° C., typically 200 to 240° C. The polymerization apparatus used is preferably a backmixing, continuous autoclave. In general, the polymerization is initiated by means of free-radically decomposing initiators, for which air or oxygen are suitable, optionally in the presence of additionally metered organic peroxides and/or hydroperoxides.

Useful organic peroxides or hydroperoxides include, for example, diisopropylbenzene hydroperoxide, cumene hydroperoxide, methyl isobutyl ketone peroxide, di-tert-butyl peroxide and tert-butyl periisononate. In addition, suitable regulators such as aliphatic aldehydes may also be used in the polymerization.

The desired relatively low proportion by weight of ethylene in the inventive copolymer arises from the fact that, proceeding from a readily polymerizable monomer mixture in which the ethylene content predominates over the (meth) acrylic acid content, and the proportion by weight of the unit derived from (meth)acrylic acid in the polymer, is increased significantly by subsequent polymer-analogous esterification of the carboxyl groups in the polymer with one or more $C_4$- to $C_{24}$-hydrocarbinols. This route is also favorable because direct polymerization of ethylene with $C_4$- to $C_{24}$-hydrocarbyl esters of acrylic acid or methacrylic acid is controllable only with difficulty. Only by this route are copolymers of ethylene and (meth)acrylic acid or of essentially ethylene and (meth)acrylic acid with the desired high chemical homogeneity obtained. Since the esterification of the second reaction stage may not proceed to completion, the inventive copolymer may comprise up to 5% by weight of unesterified (meth)acrylic acid units.

Suitable monomers (D) used in addition if desired are especially organic molecules with one or more polymerizable vinyl groups, for example vinyl acetate, vinyl propionate, vinyl butanoate, vinyl pentanoate, vinyl hexanoate, vinyl 2-ethylhexanoate, vinyl octanoate, vinyl esters of neodecanoic acid ("Veova"), vinyl decanoate, vinyl dodecanoate, vinyl tridecanoate, vinyl isotridecanoate, vinyl tetradecanoate, vinyl pentadecanoate, vinyl hexadecanoate and vinyl octadecanoate, and additionally also vinylphosphoric esters such as dimethyl vinylphosphate or diethyl vinylphosphate, or vinylsilane ($H_2C=CH-SiH_3$). Also suitable here are vinyl ethers such as cyclohexyl vinyl ether, isopropyl vinyl ether, isobutyl vinyl ether, tert-butyl vinyl ether, n-butyl vinyl ether, octyl vinyl ether, decyl vinyl ether, dodecyl vinyl ether, tetradecyl vinyl ether, hexadecyl vinyl ether and octadecyl vinyl ether.

The polymer-analogous esterification step of the second reaction stage is performed by customary esterification techniques. Preference is given here to working with acidic esterification catalysts such as methanesulfonic acid, para-toluenesulfonic acid, trifluoroacetic acid, sulfuric acid or hydrogen chloride. The water of reaction which forms is driven out typically by passing through inert gas, such as nitrogen, at elevated temperatures, especially at 120 to 200° C.

The inventive copolymer preferably has a number-average molecular weight ($M_n$) in the range from 1000 to 10 000, especially from 1500 to 3500, or alternatively a weightaverage molecular weight of 2000 to 20 000, especially of 3000 to 7000 (in each case determined by gel permeation chromatography).

The present invention also provides a process for preparing a copolymer with high chemical homogeneity, consisting of
  (A) 50 to 30% by weight of ethylene,
  (B) 50 to 70% by weight of a $C_4$- to $C_{24}$-hydrocarbyl ester of acrylic acid or methacrylic acid, or of a mixture of such hydrocarbyl esters,
  (C) 0 to 5% by weight of acrylic acid and/or methacrylic acid and
  (D) 0 to 10% by weight of one or more copolymerizable monomers,
where all monomer components in the copolymer together add up to 100% by weight,
which comprises polymerizing a mixture of 80 to 60% by weight of ethylene, 20 to 40% by weight of acrylic acid or methacrylic acid and 0 to 10% by weight of one or more copolymerizable monomers, where all monomer components in the mixture together add up to 100% by weight, in a backmixing, continuous polymerization apparatus, especially in a backmixing, continuous autoclave, preference being given to working at a pressure of 50 to 5000 bar, and subsequently polymer-analogously esterifying the resulting copolymer of ethylene and (meth)acrylic acid or of essentially ethylene and (meth)acrylic acid with a $C_4$- to $C_{24}$-hydrocarbinol or a mixture of $C_4$- to $C_{24}$-hydrocarbinols.

The inventive copolymer serves as a novel efficient cold flow improver in fuel oils. Fuel oils shall be understood in the context of the present invention to mean middle distillate fuels of fossil, vegetable or animal origin, biofuel oils ("biodiesel") and mixtures as such middle distillate fuels and biofuel oils.

Middle distillate fuels (also referred to hereinafter as "middle distillates" for short) refer in particular to fuels which are obtained by distilling crude oil as the first process step and boil within the range from 120 to 450° C. Such middle distillate fuels are used especially as diesel fuel, heating oil or kerosene, particular preference being given to diesel fuel and heating oil. Preference is given to using low-sulfur middle distillates, i.e. those which comprise less than 350 ppm of sulfur, especially less than 200 ppm of sulfur, in particular less than 50 ppm of sulfur. In special cases, they comprise less than 10 ppm of sulfur; these middle distillates are also referred to as "sulfur-free". They are generally crude oil distillates which have been subjected to refining under hydrogenating conditions and therefore comprise only small proportions of polyaromatic and polar compounds. They are preferably those middle distillates which have 90% distillation points below 370° C., in particular below 360° C. and in special cases below 330° C.

Low-sulfur and sulfur-free middle distillates may also be obtained from relatively heavy mineral oil fractions which cannot be distilled under atmospheric pressure. Typical conversion processes for preparing middle distillates from heavy mineral oil fractions include: hydrocracking, thermal cracking, catalytic cracking, coking processes and/or visbreaking. Depending on the process, these middle distillates are obtained in low-sulfur or sulfur-free form, or are subjected to refining under hydrogenating conditions.

The middle distillates preferably have aromatics contents of below 28% by weight, especially below 20% by weight. The content of normal paraffins is between 5% by weight and 50% by weight, preferably between 10 and 35% by weight.

In the context of the present invention, middle distillate fuels shall also be understood here to mean fuels which can either be derived indirectly from fossil sources such as mineral oil or natural gas, or else are prepared from biomass via gasification and subsequent hydrogenation. A typical example of a middle distillate fuel which is derived indirectly from fossil sources is the GTL ("gas-to-liquid") diesel fuel obtained by means of Fischer-Tropsch synthesis. A middle distillate is prepared from biomass, for example via the BTL ("biomass-to-liquid") process, and can be used either alone or in a mixture with other middle distillates as the fuel. The middle distillates also include hydrocarbons which are obtained by the hydrogenation of fats and fatty oils. They comprise predominantly n-paraffins.

The qualities of the heating oils and diesel fuels are laid down in more detail, for example, in DIN 51603 and EN 590 (cf. also Ullmann's Encyclopedia of Industrial Chemistry, 5th edition, volume A12, p. 617 ff.).

The inventive copolymer can, in addition to the use thereof in the middle distillate fuels, of fossil, vegetable or animal origin mentioned, which are essentially hydrocarbon mixtures, also be used in biofuel oils and in mixtures of the middle distillates mentioned with biofuel oils to improve the cold flow performance. Such mixtures are commercially available and usually contain the biofuel oils in minor amounts, typically in amounts of 1 to 30% by weight, especially of 3 to 10% by weight, based on the total amount of middle distillate of fossil, vegetable or animal origin and biofuel oil.

Biofuel oils are generally based on fatty acid esters, preferably essentially on alkyl esters of fatty acids which derive from vegetable and/or animal oils and/or fats. Alkyl esters are typically understood to mean lower alkyl esters, especially $C_1$- to $C_4$-alkyl esters, which are obtainable by transesterifying the glycerides which occur in vegetable and/or animal oils and/or fats, especially triglycerides, by means of lower alcohols, for example ethanol or in particular methanol ("FAME"). Typical lower alkyl esters based on vegetable and/or animal oils and/or fats, which find use as a biofuel oil or components therefor, are, for example, sunflower methyl ester, palm oil methyl ester ("PME"), soya oil methy ester ("SME") and especially rapeseed oil methyl ester ("RME").

The inventive copolymer brings about a significant improvement in the cold flow performance of the fuel oil, i.e. a lowering especially of the PP values, but also of the CP values and/or of the CFPP values, substantially irrespective of the origin or of the composition of the fuel oil. Precipitated paraffin crystals and crystals of fatty acid esters are generally kept suspended more effectively, such that there are no blockages of filters and lines by such sediments. In most cases, the inventive copolymer has a good range of action and thus has the effect that the precipitated crystals can be dispersed very efficiently in a wide variety of different fuel oils.

The inventive copolymer additionally brings about a lowering of the lower mixing temperature of cold flow improver additives into fuel oils. Owing to the chemical structure thereof, cold flow improver additives frequently have to be added to the refinery streams at a particular elevated minimum temperature in order to enable pumped addition and complete dissolution in the fuel oil and the homogenization thereof. This parameter—also defined as the lower mixing temperature—should be at minimum in order to avoid costly heating of the cold flow improver storage tanks in the refineries.

The inventive copolymer additionally brings about an improvement in the filterability of fuel oils comprising cold flow improver additives. This is because the presence of prior art additives leads in many cases to a deterioration in the filterability of fuel oils, which restricts the usability and the maximum dosage of the additives.

The use of the inventive copolymer may likewise, in addition to the improvement in the cold flow properties of fuel oils and of the handling with cold flow improver additives or with fuel oils comprising cold flow improver additives, improve a series of further fuel of properties. By way of example, mention shall be made here merely of the additional effect as an anticorrosive or the improvement in the oxidation stability.

The present invention also provides fuel oils which comprise 10 to 5000 ppm by weight especially 25 to 1500 ppm by weight, in particular 50 to 750 ppm by weight, of the inventive copolymer.

The fuel oils mentioned may comprise, as further additives, in amounts customary therefor, further cold flow improvers, paraffin dispersants, conductivity improvers, anticorrosive additives, lubricity additives, antioxidants, metal deactivators, antifoams, demulsifiers, detergents, cetane number improvers, solvents or diluents, dyes or fragrances or mixtures thereof. Further cold flow improvers are described, for example, in WO 2008/113757 A1. The other further additives mentioned above are, incidentally, familiar to the person skilled in the art and therefore need not be explained any further here.

The examples which follow are intended to illustrate the present invention without restricting it.

EXAMPLES

Fuels Used:

To demonstrate the effectiveness of the inventive copolymer as an additive in biofuel oils, two typical commercial biodiesel qualities (test oils B1, B2 and B3) with the following properties were used:

| B1: | Type: | RME |
|---|---|---|
| | Origin: | Perstorp Sweden |
| | CP (DIN EN 23015): | −4.0° C. |
| | CFPP (DIN EN 116): | −11° C. |
| | PP (ASTM D 97): | −12° C. |
| | Density at 15° C. (EN ISO 1285): | 882.8 kg/m³ |
| B2: | Type: | FAME |
| | Origin: | Rossi Biofuel |
| | CP (DIN EN 23015): | −3.8° C. |
| | CFPP (DIN EN 116): | −9° C. |
| | PP (ASTM D 97): | −6° C. |
| | Density at 15° C. (EN ISO 1285): | 883.0 kg/m³ |
| B3: | Type: | RME |
| | Origin: | commercial Swedish biodiesel |
| | CP (DIN EN 23015): | −5.0° C. |
| | CFPP (DIN EN 116): | −11° C. |
| | PP (ASTM D 97): | −12° C. |
| | Density at 15° C. (EN ISO 1285): | 883.1 kg/m³ |

Additives Used:

The ter- or copolymers used can be characterized as follows, T-1 (according to WO 2008/059055, commercial product) having been used for comparison and T-2 in accordance with the invention:

| T-1: | Composition: | 60.0% by weight of ethylene |
|---|---|---|
| | | 22.5% by weight of vinyl acetate |
| | | 17.5% by weight of 2-propylheptyl acrylate |
| | Molecular weights: | $M_n$ = 3000 g/mol, $M_w$ = 7300 g/mol |
| | Viscosity: | 170 mPas at 120° C. |
| T-2: | Composition: | 40.1% by weight of ethylene |
| | | 58.7% by weight of tridecyl methacrylate |
| | | 1.2% by weight of methacrylic acid |
| | Molecular weights: | $M_n$ = 3000 g/mol, $M_w$ = 7000 g/mol |
| | Viscosity: | <30 mPas at 120° C. |
| | prepared by high-pressure polymerization of a monomer mixture of 70.0% by weight of ethylene and 30.0% by weight of methacrylic acid at 220° C. and 1707 bar and subsequent esterification with excess tridecanol (molar ratio of methacrylic acid units to tridecanol: 1:1.2) in the presence of methanesulfonic acid | |

Example 1: Determination of the Cold Performance

Table 1 below, containing the pour points ("PP") determined by means of a standardized test method, shows that the effect of the inventive terpolymer (T-2) is significantly better than that of comparable prior art polymers (T-1).

TABLE 1

Determination of the PP values [° C.]

| | Test oil | | |
|---|---|---|---|
| | B1 | B2 | B3 |
| | Dosage* | | |
| | 900 ppm | 900 ppm | 500 ppm |
| Additive T-1 | −15 | −18 | −12 |
| Additive T-2 | −38 | −36 | −39 |

*Polymers T-1 and T-2 were each metered in as a concentrated solution in a customary solvent. The dosage specified in each case is based on the polymer content of the solution.

The invention claimed is:

1. A process for preparing a copolymer with high chemical homogeneity, consisting of
   (A) 50 to 30% by weight of ethylene,
   (B) 50 to 70% by weight of a $C_4$- to $C_{24}$-hydrocarbyl ester of acrylic acid or methacrylic acid, or of a mixture of said hydrocarbyl esters,
   (C) 0 to 5% by weight of acrylic acid and/or methacrylic acid and
   (D) 0 to 10% by weight of one or more copolymerizable monomers,
   where all monomer components in the copolymer together add up to 100% by weight, which comprises polymerizing a mixture of 80 to 60% by weight of ethylene, 20 to 40% by weight of acrylic acid and/or methacrylic acid and 0 to 10% by weight of one or more copolymerizable monomers, where all monomer components in the mixture together add up to 100% by weight, in a backmixing, continuous polymerization apparatus, and subsequently polymer-analogously esterifying the resulting copolymer of ethylene and (meth)acrylic acid or of essentially ethylene and (meth)acrylic acid with a $C_4$- to $C_{24}$-hydrocarbinol or a mixture of $C_4$- to $C_{24}$-hydrocarbinols.

2. The process according to claim 1, wherein polymerization is effected at a pressure of 50 to 5000 bar.

3. The process according to claim 1, wherein the mixture of 80 to 60% by weight of ethylene, 20 to 40% by weight of acrylic acid and/or methacrylic acid and 0 to 10% by weight of one or more copolymerizable monomers is polymerized in a backmixing, continuous autoclave.

* * * * *